(12) United States Patent
Minami et al.

(10) Patent No.: US 10,248,481 B2
(45) Date of Patent: Apr. 2, 2019

(54) INFORMATION PROCESSING DEVICE, INFORMATION PROCESSING SYSTEM AND PROGRAM

(71) Applicant: KONICA MINOLTA, INC., Chiyoda-ku, Tokyo (JP)

(72) Inventors: Takeshi Minami, Amagasaki (JP); Junichi Hase, Osaka (JP); Nobuhiro Mishima, Osaka (JP); Akihiro Torigoshi, Itami (JP); Tomoaki Nakajima, Kobe (JP); Daisuke Nakano, Kobe (JP); Yuji Tanaka, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/631,322

(22) Filed: Jun. 23, 2017

(65) Prior Publication Data

US 2017/0371729 A1 Dec. 28, 2017

(30) Foreign Application Priority Data

Jun. 24, 2016 (JP) ................. 2016-125955

(51) Int. Cl.
*G06F 11/07* (2006.01)
*G06F 13/38* (2006.01)
*G06F 13/42* (2006.01)
*G06K 15/12* (2006.01)

(52) U.S. Cl.
CPC ........ *G06F 11/0703* (2013.01); *G06F 13/385* (2013.01); *G06F 13/4226* (2013.01); *G06K 15/128* (2013.01); *G06K 2215/0002* (2013.01); *G06K 2215/0085* (2013.01)

(58) Field of Classification Search
None
See application file for complete search history.

(56) References Cited

U.S. PATENT DOCUMENTS

2017/0104890 A1* 4/2017 Miyazaki ................. A61B 5/01

FOREIGN PATENT DOCUMENTS

JP 2013-146874 A 8/2013

* cited by examiner

*Primary Examiner* — Fan Zhang
(74) *Attorney, Agent, or Firm* — Buchanan Ingersoll & Rooney PC

(57) ABSTRACT

An information processing device includes: an acquisition unit configured to acquire a determination result of a state of a user, who has given a transmission job execution instruction, determined based on biological information of the user; and a job control unit configured to control an execution of the transmission job according to the user state determination result, wherein when it is determined that the user is in an off-normal state, the job control unit executes a confirmation request process to request the user to make a confirmation related to the transmission job.

11 Claims, 12 Drawing Sheets

Scan to E-mail

PLEASE CONFIRM THE DESTINATION

To: abc@xxx.com

Cc: xyz@xxx.com

CONFIRM — 311

CHANGE — 312

310, 300

Scan to E-mail — 320, 300

PLEASE CONFIRM SCAN DATA TO TRANSMIT

NUMBER OF PAGES: 3

CONFIRM — 321

CHANGE — 322

FIG. 9

Scan to E-mail 330, 300

PLEASE CONFIRM THAT THE ORIGINAL IS NOT LEFT

CONFIRM 331

INFORMATION PROCESSING DEVICE, INFORMATION PROCESSING SYSTEM AND PROGRAM

The entire disclosure of Japanese Patent Application No. 2016-125955 filed on Jun. 24, 2016 including description, claims, drawings, and abstract are incorporated herein by reference in its entirety.

BACKGROUND OF THE INVENTION

Field of the Invention

The present invention relates to an information processing device and a technology related thereto.

Description of the Related Art

Regarding an information processing device such as a multi-functional peripheral (MFP) or the like, there is a technology for immediately transmitting transmission target data (image data of an original, for example) related to a transmission job in response to an execution instruction of the transmission job (a facsimile transmission job, for example) (see JP 2013-146874 A).

Here, when a transmission job is executed, a user may make a mistake related to the transmission job.

For example, the user may make a mistake of giving a transmission job execution instruction with a wrong destination set, without being aware that the user has set the wrong destination of the transmission target data.

As a result, when the transmission target data is transmitted to the wrong destination as instructed, confidential information and the like may be leaked since the transmission target data is mistakenly transmitted to the destination to which the data is not to be transmitted, in addition to that a person who has received the transmission target data (a person who is not an original receiver) is confused.

SUMMARY OF THE INVENTION

In view of the above, an object of the present invention is to provide a technology that can suppress an occurrence of a mistake by a user related to the transmission job.

To achieve the abovementioned object, according to an aspect, an information processing device reflecting one aspect of the present invention comprises: an acquisition unit configured to acquire a determination result of a state of a user, who has given a transmission job execution instruction, determined based on biological information of the user; and a job control unit configured to control an execution of the transmission job according to the user state determination result, wherein when it is determined that the user is in an off-normal state, the job control unit executes a confirmation request process to request the user to make a confirmation related to the transmission job.

According to an invention of Item. 2, in the information processing device of Item. 1, the biological information is preferably information that changes reflecting a mental condition and/or a physical condition of the user.

According to an invention of Item. 3, in the information processing device of Item. 1 or 2, the biological information preferably includes information related to at least one of a pulse wave, an electrocardiogram, a temperature, a heart rate, and a blood pressure.

According to an invention of Item. 4, in the information processing device of any one of Items. 1 to 3, the job control unit preferably decides that the transmission of transmission target data related to the transmission job needs to be immediately executed without executing the confirmation request process when it is determined that the user is in a normal state, and executes the confirmation request process when it is determined that the user is in an off-normal state.

According to an invention of Item. 5, in the information processing device of any one of Items. 1 to 4, the job control unit also preferably executes the confirmation request process when the user is in a normal state, and a confirmation of a larger number of confirmation items are preferably requested in the confirmation request process executed in a case where it is determined that the user is in an off-normal state, compared to the number of the confirmation items requested to confirm in a confirmation request process executed in a case where it is determined that the user is in an normal state.

According to an invention of Item. 6, in the information processing device of any one of Items. 1 to 5, in a case where it is determined that the user is in an off-normal state, the job control unit preferably executes a first type confirmation request process when it is determined that an off-normal level, which is a level of the off-normal state of the user, is smaller than a predetermined threshold value and executes a second type confirmation request process when it is determined that the off-normal level is greater than the predetermined threshold value, and a larger number of confirmation items are preferably requested to be confirmed in the second type confirmation request process, compared to the number of confirmation items requested to confirm in the first type confirmation request process.

According to an invention of Item. 7, in the information processing device of Item. 6, the information processing device preferably further comprises a setting control unit configured to be able to set the predetermined threshold value for each user, wherein the setting control unit preferably lowers the predetermined threshold value related to the user when a change rate, which is calculated by dividing a number of changes related to the transmission job setting content made during the second type confirmation request process executed related to the user by a number of executions during the second type confirmation request process executed related to the user, is greater than a predetermined rate.

According to an invention of Item. 8, in the information processing device of any one of Items. 1 to 6, it is preferably determined that the state of the user is in an off-normal state when the biological information of the user is greater than a predetermined reference value, and the information processing device preferably further comprises a setting control unit configured to be able to set the predetermined reference value for each user, wherein the setting control unit preferably lowers the predetermined reference value related to the user when a change rate, which is calculated by dividing a number of changes related to the transmission job setting content made during the confirmation request process executed related to the user by a number of executions during the confirmation request process executed related to the user, is greater than a predetermined rate.

According to an invention of Item. 9, in the information processing device of any one of Items. 1 to 8, the job control unit preferably decides that transmission of the transmission target data needs to be executed when the confirmation request process is executed, only in a case where a confirmation completion operation indicating an intention that a confirmation related to the transmission job is completed is given by the user.

According to an invention of Item. 10, in the information processing device of any one of Items. 1 to 9, the acquisition unit preferably acquires the biological information measured by a wearable device worn by the user from the wearable device via communication with the wearable device.

According to an invention of Item. 11, in the information processing device of any one of Items. 1 to 9, the acquisition unit preferably acquires the biological information, which is transferred to a server after measured by a wearable device worn by the user and stored in the server, from the server via communication with the server.

To achieve the abovementioned object, according to an aspect, a non-transitory recording medium storing a computer readable program reflecting one aspect of the present invention causes a computer mounted in an information processing device to execute the steps of: step a) of acquiring a determination result of a user's state determined based on biological information of the user who has given a transmission job execution instruction; and step b) of controlling an execution of the transmission job according to the determination result of the user's state, wherein when it is determined that the user is in an off-normal state in the step b), a confirmation request process for requesting the user to make a confirmation related to the transmission job is executed.

To achieve the abovementioned object, according to an aspect, an information processing system reflecting one aspect of the present invention comprises: an acquisition unit configured to acquire biological information of a user who has given a transmission job execution instruction; a determination unit configured to determine a state of the user based on the acquired biological information; and a job control unit configured to control an execution of the transmission job according to the user's state determination result, wherein the job control unit executes a confirmation request process for requesting a confirmation related to the transmission job to the user when it is determined that the user is in an off-normal state.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a flowchart related to a user state determination process or the like;

FIG. 6 is a diagram illustrating a confirmation screen;

FIG. 9 is a diagram illustrating a confirmation screen;

DESCRIPTION OF THE PREFERRED EMBODIMENTS

Hereinafter, an embodiment of the present invention will be described with reference to the drawings. However, the scope of the invention is not limited to the illustrated examples.

1. First Embodiment

<1-1. Configuration Outline>

Figure 1:
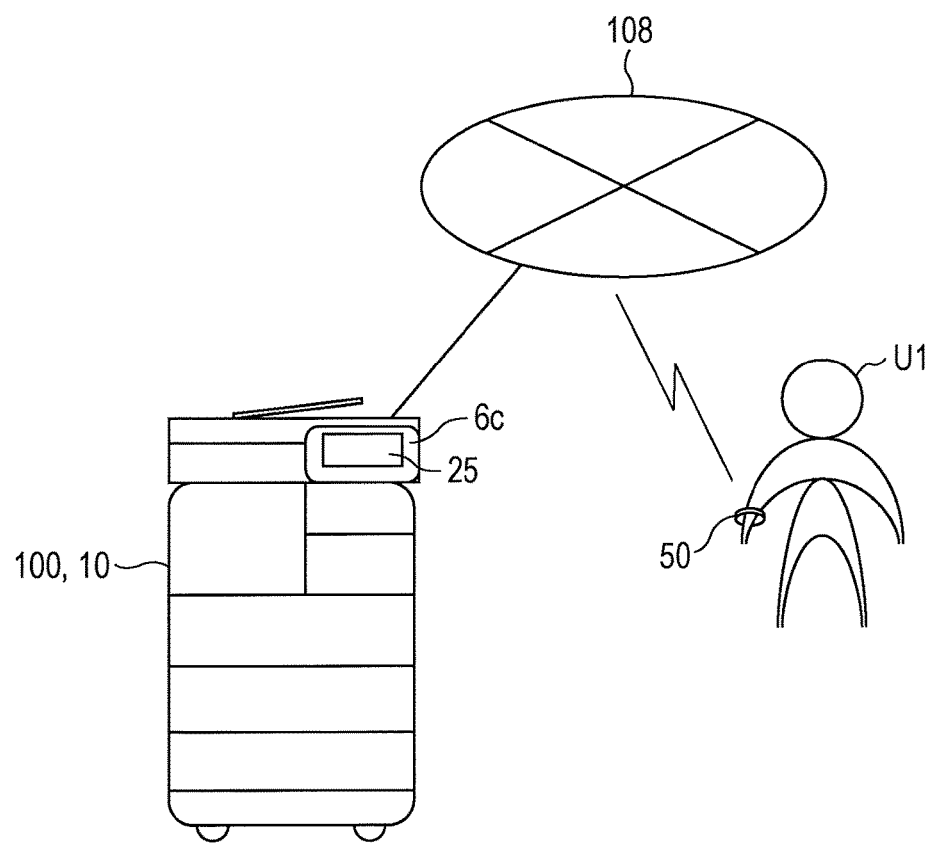
FIG. 1 is a diagram illustrating an information processing system according to the present invention.

FIG. 1 is a diagram illustrating an information processing system 1 (1A) according to the present invention. As illustrated in FIG. 1, the information processing system 1(1A) includes an information processing device 100 and a wearable terminal 50. It is noted that, in this information processing system 1A, a multi-functional peripheral (MFP) 10 is described as an example of the information processing device 100.

The MFP 10 and the wearable terminal 50 can respectively perform network communication via a network 108. The network 108 is composed of a local area network (LAN), the Internet, or the like. Further, the manner to connect to the network 108 may be wired or wireless.

Further, the MFP 10 and the wearable terminal 50 may be directly (without using the network 108) and wirelessly connected by using various wireless communication technologies. For example, near field communication is used for communication between the MFP 10 and the wearable terminal 50. As the near field communication, for example, communication based on Bluetooth low energy (Bluetooth (registered trademark) LE), near field radio communication (NFC), or the like is used.

<1-2. Configuration of MFP>

Figure 2:
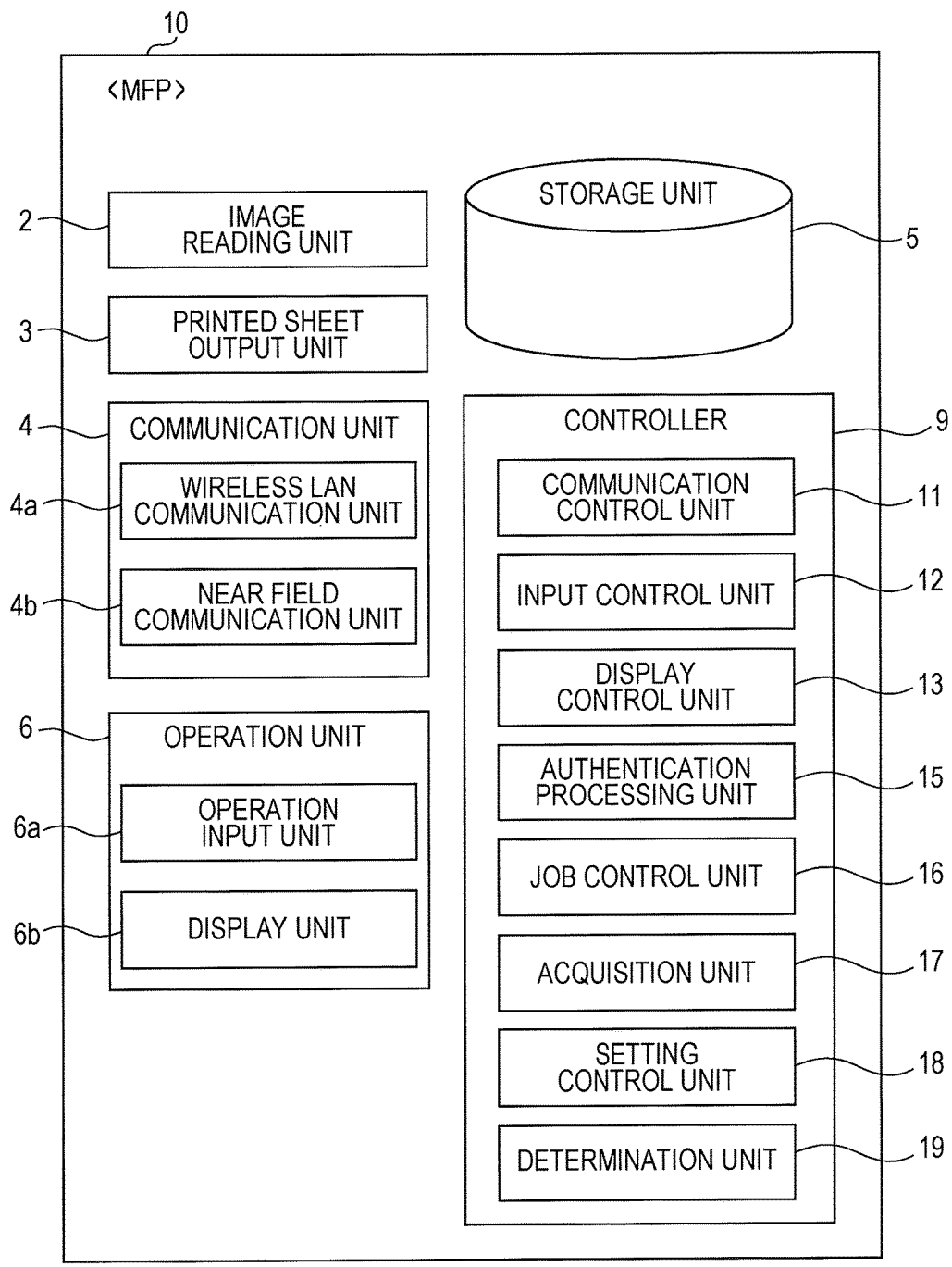
FIG. 2 is a diagram illustrating a functional block of an information processing device (MFP)

FIG. 2 is a diagram illustrating a functional block of the MFP 10. Here, the MFP 10 is also referred to as an image processing device or an image forming device. In FIG. 2, functional blocks of the MFP 10 are illustrated.

The MFP 10 is a device including a scan function, a copy function, a facsimile function, an e-mail transmission function, a box storage function, or the like (also referred to as a multi function machine). More specifically, as illustrated in the functional block diagram of FIG. 2, the MFP 10 includes an image reading unit 2, a printed sheet output unit 3, a communication unit 4, a storage unit 5, an operation unit 6, a controller 9, and the like, and each of the units are operated in combination to realize various functions.

The image reading unit 2 is a processing unit that optically reads (scans) an original placed at a predetermined position (on an auto document feeder (ADF), a flat glass, or the like) of the MFP 10 and generates image data (also referred to as an original image, a scanned image, scanned data and the like) of the original. The image reading unit 2 is also referred to as a scanning unit.

The printed sheet output unit 3 is an output unit that prints an image on various types of media such as a sheet of paper based on data related to a printing target and outputs the media.

The communication unit 4 is a processing unit that can perform facsimile communication via a public line or the like. Further, the communication unit 4 can also perform various types of wireless communication. More specifically, the communication unit 4 includes a wireless LAN communication unit 4a that performs wireless communication by a wireless LAN (IEEE 802.11 or the like) and a near field communication unit 4b that performs near field communication (Bluetooth LE in this example).

The storage unit 5 is composed of a storage device such as a hard disk drive (HDD) or the like.

The operation unit 6 includes an operation input unit 6a that accepts an input of an operation on the MFP 10 and a display unit 6b that displays various information.

In the MFP 10, a substantially plate-shaped operation panel unit 6c is provided (see FIG. 1). Further, the operation panel unit 6c includes a touch panel 25 on a front side (see FIG. 1). The touch panel 25 functions as a part of the operation input unit 6a and also functions as a part of the display unit 6b. The touch panel 25 is composed of a liquid crystal display panel in which various sensors and the like are embedded so as to display various information and accept an input of various operations by an operator.

The controller (control unit) 9 is a control device that is provided in the MFP 10 and integrally controls the MFP 10. The controller 9 is composed as a computer system that includes a CPU, various semiconductor memories (RAM and ROM) and the like. The controller 9 realizes various types of processing units by executing a predetermined software program (hereinafter, also simply referred to as a program) stored in a ROM (for example, EEPROM (registered trademark)) in the CPU. Here, the program (more specifically, a program module group) may be recorded in a portable recording medium such as a USB memory, read from the recording medium and installed in the MFP 10. Or, the program may be downloaded via the network and installed in the MFP 10.

Concretely, as illustrated in FIG. 2, the controller 9 executes the program and realizes various processing units including a communication control unit 11, an input control unit 12, a display control unit 13, an authentication processing unit 15, a job control unit 16, an acquisition unit 17, a setting control unit 18, and a determination unit 19.

The communication control unit 11 is a processing unit that controls the communication operation with another device (the wearable terminal 50 or the like), in collaboration with the communication unit 4 and the like. The communication control unit 11 includes a transmission control unit that controls a transmission operation of various data and a reception control unit that controls a reception operation of various data. In response to a transmission execution instruction from the job control unit 16, the communication control unit 11 executes transmission (a transmission process) of transmission target data related to a transmission job (a job including a transmission target data transmission process) (an e-mail transmission job, a facsimile transmission job, or the like).

The input control unit 12 is a control unit that controls an operation input action on the operation input unit 6a (the touch panel 25 or the like). For example, the input control unit 12 controls the action to accept an operation input on an operation screen displayed on the touch panel 25.

The display control unit 13 is a processing unit that controls a display action of the display unit 6b (the touch panel 25 or the like). For example, the display control unit 13 displays a confirmation screen 300 (see FIG. 6 and the like) on the touch panel 25.

The authentication processing unit 15 is a processing unit that controls an authentication process (a login process) by the user.

The job control unit 16 is a processing unit that controls an action (an image read action, a data transmission action, and the like) of various jobs. For example, the job control unit 16 controls an execution of the transmission job according to a user state determined based on biological information (biological information of the user who has instructed to execute the transmission job) acquired by the acquisition unit 17.

Concretely, when it is determined that the user who has instructed the execution of the transmission job is in a normal state, the job control unit 16 determines to immediately transmit transmission target data of the transmission job without executing a confirmation request process (described later). Then, the job control unit 16 works together with the communication control unit 11 and the like and transmits the transmission target data.

Further, when it is determined that the user is in an off-normal state, the job control unit 16 performs a confirmation request process to request the user to confirm the transmission job. More specifically, the job control unit 16 works together with the display control unit 13 and displays the confirmation screen 300 (see FIG. 6 and the like) on the touch panel 25 of the MFP 10. Then, when the transmission job is confirmed on the confirmation screen 300 (when a confirmation completion operation that indicates an intention that the confirmation is completed is applied by the user), the job control unit 16 works together with the communication control unit 11 and the like and transmits the transmission target data.

The acquisition unit 17 is a processing unit that controls an action to acquire various information. For example, the acquisition unit 17 works together with the wearable terminal 50 and acquires biological information of the user who has instructed an execution of the transmission job (and is wearing the wearable terminal 50). The biological information will be described later. Further, the acquisition unit 17 acquires a determination result of the user state (the condition of the user) determined by the determination unit 19 based on the biological information.

The setting control unit 18 is a processing unit that controls various settings of the MFP 10.

The determination unit 19 is a processing unit that controls actions of various determination processes. For example, the determination unit 19 determines whether the user state is in a normal state or an off-normal state based on acquired biological information of the user (who has instructed the execution of the transmission job).

<1-3. Configuration of Wearable Terminal>

Next, a configuration of the wearable terminal (also referred to as a wearable device) 50 will be described.

The wearable terminal 50 is a device that can work together with the MFP 10. More specifically, the wearable terminal 50 is an information input/output terminal device (an information terminal) that can perform wireless communication (near field communication and network communication) with the MFP 10.

The wearable terminal 50 is a biological information detection device that detects (measures) user's biological information (which is, in more detail, biological information that changes according to the state of the user (dynamic biological information in other words)). In this example, as the wearable terminal 50, a device that can detect (measure) user's heart rate as the biological information of the user will be described. Here, it is not limited to this example and the wearable terminal 50 may be a device that detects (measures) biological information other than the heart rate (for example, pulse wave, electrocardiogram, temperature, and/ or blood pressure). The biological information is information that changes over time according to user's mental condition (frustrated condition, rushing condition, or the like) and/or physical condition. Here, the wearable terminal 50 is also referred to as a "biological information detection device" that detects user's biological information.

Here, in this example, as the wearable terminal 50, a wristband type (wrist wearable) device is described. However, it is not limited to this example and various types of devices may be used as the wearable terminal 50.

Figure 3:
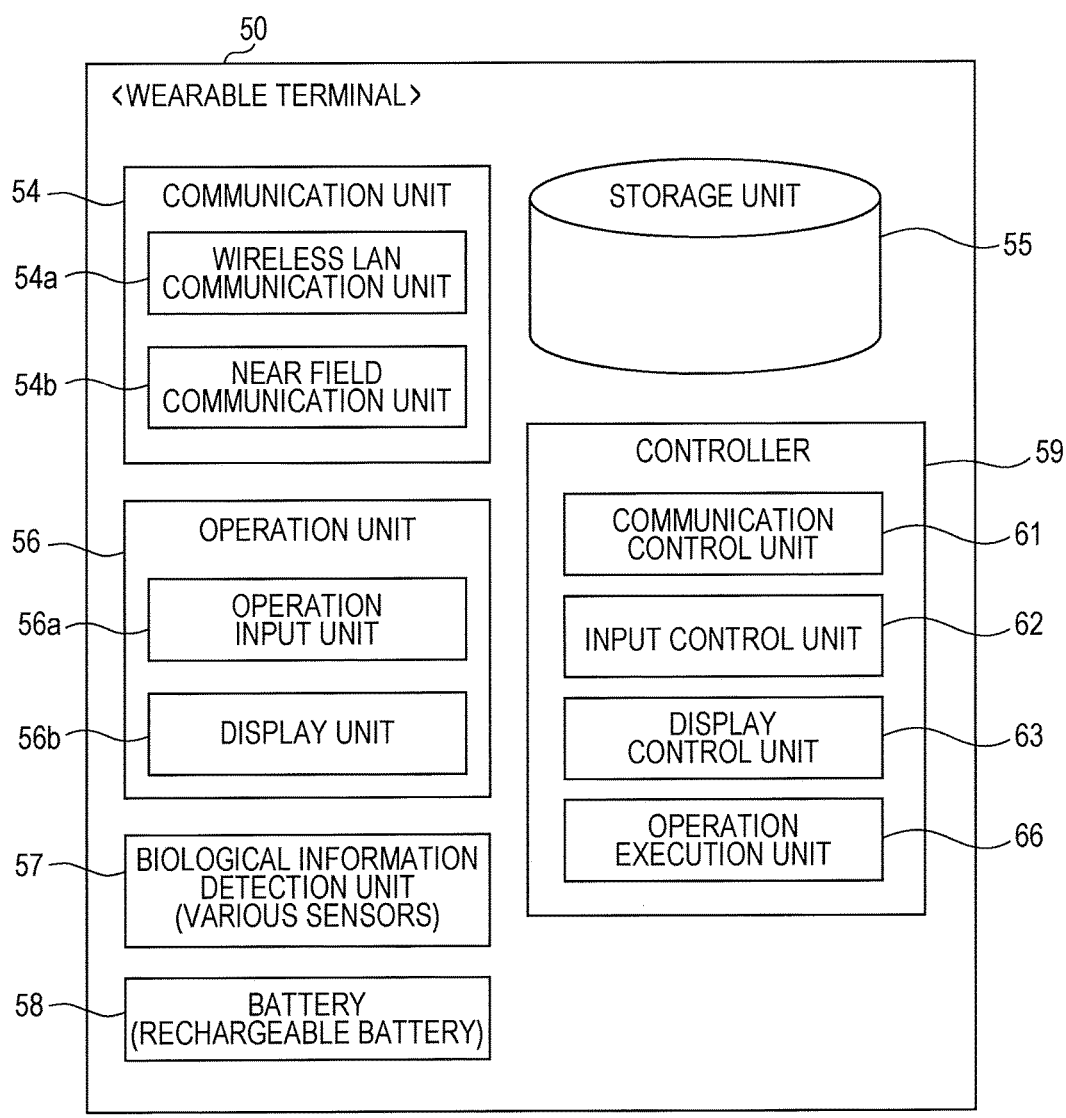
FIG. 3 is a functional block diagram illustrating an outline configuration of a wearable terminal.

FIG. 3 is a functional block diagram illustrating an outline configuration of the wearable terminal 50.

As illustrated in the functional block diagram of FIG. 3, the wearable terminal 50 includes a communication unit 54, a storage unit 55, a biological information detection unit 57, a battery 58, a controller 59, and the like and realizes various functions by operating these units in a combined manner.

The communication unit 54 can perform various wireless communication (including near field communication and the like). Concretely, the communication unit 54 includes a wireless LAN communication unit 54*a* that performs wireless communication by wireless LAN (IEEE 802.11 or the like) and a near field communication unit 54*b* that performs near field communication (Bluetooth LE in this example).

The storage unit 55 is composed of a storage device such as a non-volatile semiconductor memory.

The biological information detection unit 57 includes various sensors for detecting biological information such as a heart rate. The biological information detection unit 57 detects (measures) biological information of the user (the user wearing the wearable terminal 50).

The battery 58 is a secondary battery (a rechargeable battery) and supplies power to the wearable terminal 50.

The operation unit 56 includes an operation input unit 56*a* that accepts an operation input to the wearable terminal 50 and a display unit 56*b* that displays various information. The wearable terminal 50 includes a touch panel configured by providing various sensors and the like in a liquid crystal display panel. The touch panel functions as a part of the operation input unit 56*a* and also functions as a part of the display unit 56*b*.

The controller 59 of FIG. 3 is a control device that is provided in the wearable terminal 50 and integrally controls the wearable terminal 50. The controller 59 is composed as a computer system including a CPU, various semiconductor memories (RAM and ROM) and the like. The controller 59 realizes various processing units by executing, in the CPU, a predetermined software program (program) stored in a memory unit (a semiconductor memory or the like). Here, the program (in more detail, a group of program modules) may be recorded in a portable recording medium such as a USB memory and read from the recording medium to be installed in the wearable terminal 50. Or, the program may be downloaded via a network or the like and installed in the wearable terminal 50.

In the wearable terminal 50, a program (a collaborative program) or the like to collaborate with the MFP 10 has been installed. The collaborative program is an application software program (also simply referred to as an application) that realizes various processes (such as a process to detect biological information and a process to transmit the biological information).

More specifically, the controller (control unit) 59 realizes various processing units including a communication control unit 61, an input control unit 62, a display control unit 63, and an operation execution unit 66 by executing the collaborative program or the like.

The communication control unit 61 is a processing unit that controls an action to communicate with the MFP 10 in collaboration with the communication unit 54 and the like.

The input control unit 62 is a control unit that controls an action to input an operation to the operation input unit 56*a* (the touch panel or the like).

The display control unit 63 is a processing unit that controls a display action of the display unit 56*b* (the touch panel or the like).

The operation execution unit 66 is a processing unit that integrally executes various collaborative actions with the MFP 10.

<1-4. Actions>

Here, when executing the transmission job, the user may make a mistake related to the transmission job. Especially, the user who is in a mentally unstable condition may lose concentration and likely to make a mistake related to the transmission job compared to a case in a mentally stable condition.

In view of the above circumstance, the information processing system 1 controls an execution of the transmission job according to the condition of the user who has instructed the execution of the transmission job.

Figure 4:
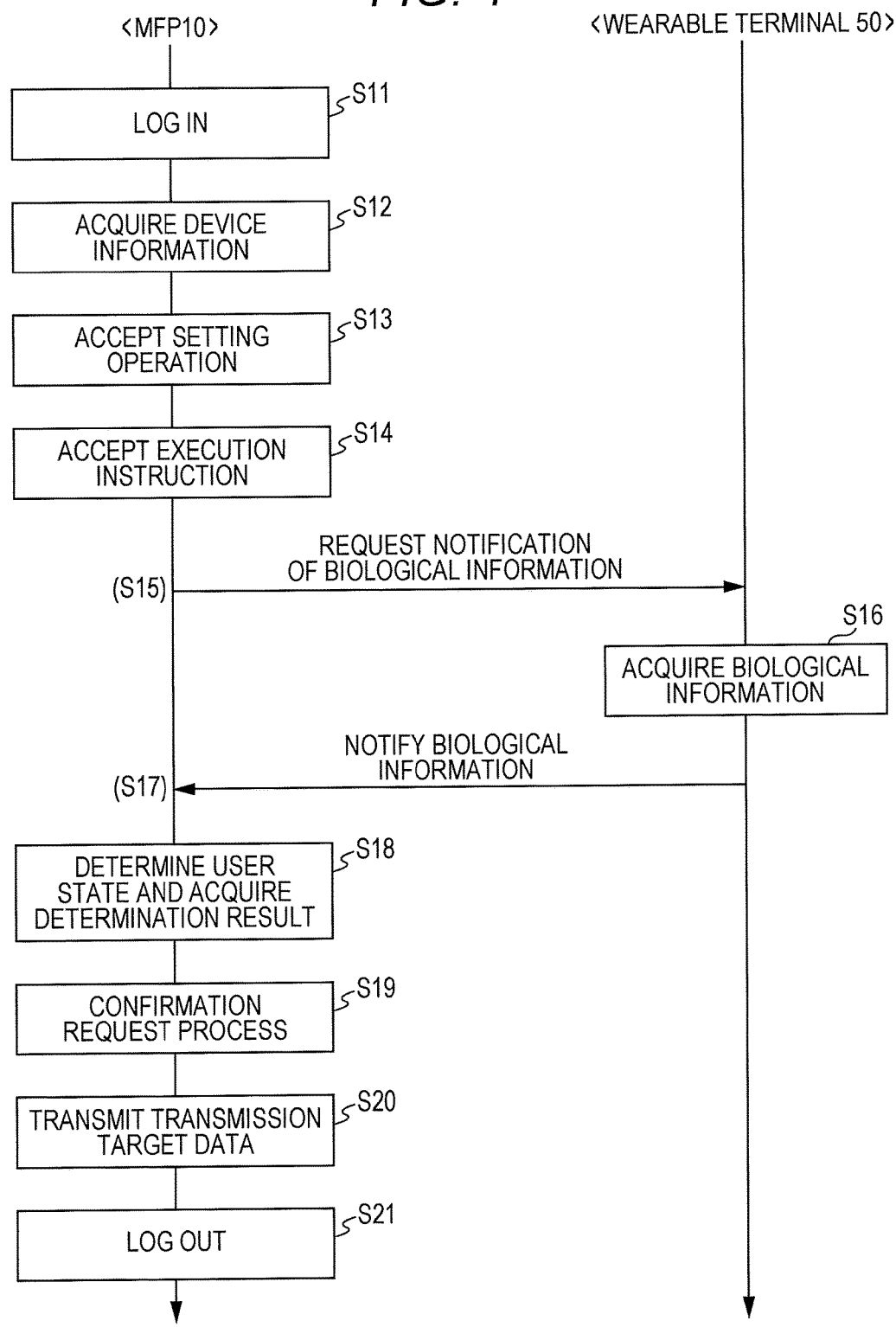
FIG. 4 is a timing diagram illustrating an operation and the like of the information processing system.

FIG. 4 is a timing diagram illustrating an action in the information processing system 1, which is, more specifically, an action performed when the transmission job is executed.

Concretely, in the system 1, when an instruction to execute a transmission job is given by a user (a user U1 for example) (step S14), the MFP 10 acquires biological information of the user U1 from the wearable terminal 50 (steps S15 to S17). Then, the MFP 10 determines whether the state of the user U1 is in a normal state or an off-normal state based on the acquired biological information (step S18) and controls the execution of the transmission job according to the determination result of the state of the user U1.

For example, when it is determined that the user U1 is in a normal state, the transmission of the transmission target data is immediately executed (step S20) without executing the later described confirmation request process (step S19).

On the other hand, when it is determined that the user U1 is in an off-normal state, the confirmation request process to request the user U1 a confirmation related to the transmission job (step S19) without immediately executing the transmission of the transmission target data. Then, when the confirmation related to the transmission job (the confirmation by the user U1) is completed, the transmission of the transmission target data is executed (step S20).

Hereinafter, referring to FIG. 4 and the like, an action in the system 1 will be described in detail.

Here, it is assumed a case where the MFP 10 executes an e-mail transmission job (which will be later described) in response to the execution instruction by the user U1. The e-mail transmission job is a transmission job that the MFP 10 transmits an electric mail (hereinafter, also simply referred to as "mail") having electrical data as an attachment file to a destination specified (set) by the user. More specifically, in this example, an e-mail transmission job (also referred to as "a scanned data attached e-mail transmission job") that the MFP 10 transmits mail including scanned data of an original scanned by the MFP 10 as an attachment file to a destination specified (set) by the user. In the "scanned data attached e-mail transmission job," a series of processes including a process prior to the transmission of the scanned data (an original reading process, a scan data generation process, and the like) and a transmission process of the generated scan data (a mail transmission process) are executed.

Firstly, in step S11 (FIG. 4), a log-in process is performed. More specifically, the user (user U1) wearing the wearable terminal 50 operates the operation panel unit 6c of the MFP 10 and inputs own user authorization information (for example, a user ID and a password) on the login screen (not illustrated). When it is confirmed that the input user authorization information is correct, the MFP 10 authenticate the login by the user U1.

Next, in step S12, the MFP 10 acquires device information of the wearable terminal 50 worn by the user U1. Concretely, a management table that associates correct login information (user authorization information) of the user U1 and the device information of the wearable terminal 50 of the user U1 is stored in the MFP 10. Then, based on the management table, the MFP 10 acquires device information (device identification information or the like) of the wearable terminal 50 corresponding to the user authorization information of the login user U1. The acquired device information is used in communication (near field communication in this example) with the wearable terminal 50 in a later described biological information acquisition process (steps S15 to S17).

Here, in this example, the management table that associates the user authorization information and the device information is stored in the MFP 10; however, this does not set any limitation and the management table may be stored in another device (a server for example). Further, the MFP 10 may communicate with the another device (a server) and acquires the device information of the wearable terminal 50 of the login user U1 from the another device (server).

Then, the user U1 places the original to the MFP 10 (more specifically, an ADF or a flat glass) and performs various setting operations related to the transmission job by using the operation panel unit 6c. The MFP 10 accepts the setting operations by the user U1 (step S13).

For example, on a setting screen (not illustrated) of the e-mail transmission job (the "scan data attached e-mail transmission job" in this example), the user U1 sets a file format or the like of scan data to generate and sets a transmission destination of the scan data by specifying (or inputting) an e-mail address of the transmission destination (a receiver) of the scan data.

Then, when various setting operations related to the e-mail transmission job are completed, the user U1 gives an e-mail transmission job execution instruction (start instruction) to the MFP 10 by pressing a start button (not illustrated) of the operation panel unit 6c (step S14).

When the e-mail transmission job execution instruction is given by the user U1, the MET 10 executes a process prior to the transmission of the scan data among the series of the processes of the e-mail transmission job (the "scan data attached e-mail transmission job" in this example) in response to the execution instruction. More specifically, the original placed on the MFP 10 is read (scanned) and scan data of the read original is generated. Here, at this point, the scan data transmission process among the series of the processes is not executed and the generated scan data is once stored in the storage unit 5 of the MFP 10.

Further, when the transmission job execution instruction is given by the user U1, the MFP 10 performs communication (near field communication) or the like with the wearable terminal 50 of the user U1 by using the device information which is acquired in advance in step S12. Then, the MFP 10 executes later described processes (biological information acquisition process) in steps S15 to S17.

Concretely, the MFP 10 firstly transmits biological information notification request to the wearable terminal 50 via the near field communication (step S15). Next, when the biological information notification request is received, the wearable terminal 50 measures (detects) biological information (a heart rate in this example) of the user U1 by using the biological information detection unit 57 (step S16). Then, the wearable terminal 50 transmits the measured biological information (a heart rate of the user U1) to the MFP 10 via the near field communication (step S17).

In this manner, the MFP 10 acquires the biological information (the biological information of the user U1), which is measured by the wearable terminal 50 worn by the user U1, from the wearable terminal 50 via communication (near field communication in this example) with the wearable terminal 50.

Then, when the biological information of the user U1 is acquired from the wearable terminal 50, the MFP 10 executes a process to determine a state of the user U1 (user state) and acquires a user state determination result, which is determined based on the biological information (step S18).

Figure 5:
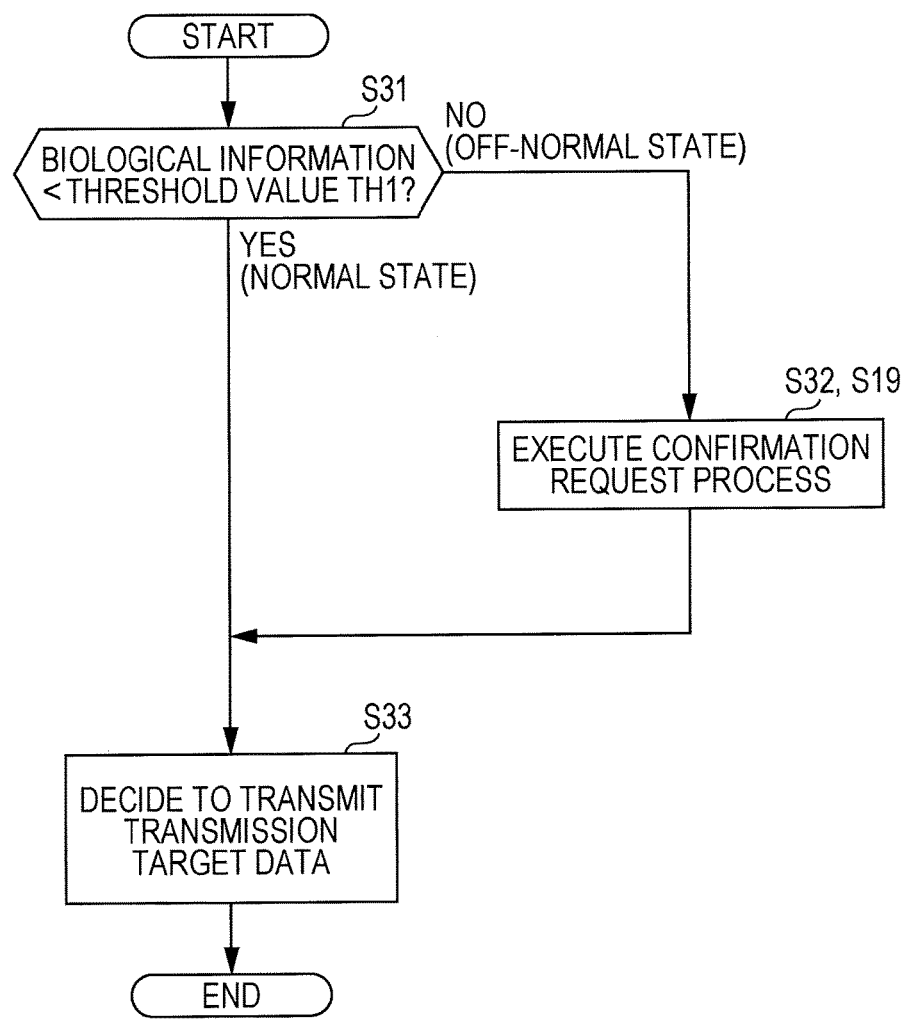

FIG. 5 is a flowchart related to the user state determination process. The process of FIG. 5 starts when the biological information is acquired from the wearable terminal 50.

Firstly, in step S31, the MFP 10 determines (judges) whether the state of the user U1 (the user who has given an e-mail transmission job execution instruction) is in a normal state or an off-normal state based on the acquired biological information.

More specifically, it is determined whether the state of the user U1 is in a normal state or an off-normal state by determining which is larger between the biological information (a heart rate for example) acquired by the wearable terminal 50 of the user U1 and a predetermined threshold value TH1 (a predetermined reference value). Here, in this example, a value ("80" (=60+20)), in which a predetermined value (a value "20" for example) is added to a typical heart rate (an average heart rate value or the like) (a value "60" for example), is used as the threshold value TH1.

For example, when it is determined that the acquired heart rate (the heart rate of the user U1) is smaller (lower) than the threshold value TH1 (the reference value) in step S31, the MFP 10 determines that the state of the user U1 is in a normal state. In other words, when the heart rate of the user U1 who has given the transmission job execution instruction is smaller than the threshold value TH1, it is determined that the user U1 is mentally stable (regular state). Then, when a determination result that the user U1 is in a normal state, the process proceeds to step S33.

In step S33, the MFP 10 decides to immediately execute the transmission of the transmission target data (the scan data in this example) related to the transmission job (the e-mail transmission job in this example) given by the user U1. In other words, when the user U1 is in a normal state (regular state), a confirmation request process (later described step S32) is not executed (the confirmation request process can be omitted).

Then, the process of FIG. 5 ends and the process in step S20 of FIG. 4 is executed.

Concretely, when it is decided to immediately transmit the transmission target data (the scan data in this example) (step S33 (FIG. 5)), the MFP 10 transmits the scan data (step S20 (FIG. 4)). More specifically, a transmission execution instruction to transmit the scan data to a destination set (specified) by the user U1 is notified from the job control unit 16 to the communication control unit 11. Then, in response to the transmission execution instruction, the scan data (the scan data, which is generated in response to the execution instruction from the user U1 and once stored in the storage unit 5) is transmitted to the destination set by the user U1. More specifically, the mail to which the scan data is attached as an attachment file is transmitted to the destination set (specified) by the user U1.

Here, the description returns to step S31 of FIG. 5.

When it is determined that the heart rate (the heart rate of the user U1) acquired from the wearable terminal 50 is greater (higher) than the threshold value TH1 (the reference value) in step S31, the MFP 10 determines that the state of the user U1 is an off-normal state. In other words, when the heart rate of the user U1 who has given the transmission job execution instruction is greater than the threshold value TH1, it is determined that the user U1 is in a mentally unstable state (not in a regular state). Here, in this case, when the heart rate is equal to the threshold value TH1, it is also determined that the state of the user U1 is an off-normal state. Here, this does not set any limitation and, when the heart rate is equal to the threshold value TH1, the state of the user U1 may be determined as a normal state.

Then, when a determination result that the user U1 is in an off-normal state, the process proceeds to step S32 and the MFP 10 executes a confirmation request process to request the user U1 to make a confirmation related to the transmission job (the e-mail transmission job in this example) prior to (before) the transmission process of the transmission target data (step S20 (FIG. 4)).

Concretely, the MFP 10 firstly decides to hold the transmission of the transmission target data related to the transmission job given by the user U1. In other words, it is decided not to immediately transmit the transmission target data. Then, the confirmation request process is executed.

More specifically, the MFP 10 displays the confirmation screen 300 (see FIG. 6) used to request the user to make a confirmation related to the transmission job (a confirmation related to the setting content of the transmission job for example) on the touch panel 25 of the MFP 10. Then, the MFP 10 requests the user to make a confirmation related to the transmission job by using the confirmation screen 300.

In the confirmation request process, the user (the user who has given the transmission job execution instruction) is requested to confirm M number (M=1 in this example) of confirmation items to be confirmed related to the transmission job.

Here, in a case where the user makes a mistake of transmitting the transmission target data to a wrong destination, this may cause a problem that confidential information is leaked since the transmission target data has been mistakenly transmitted to a destination to which the data should not be transmitted, in addition to a problem that the receiver (who is not the original receiver) of the transmission target data is made confused. In the view of the above, in the present embodiment, to prevent a mistake of transmitting the transmission target data to a wrong destination, the user is requested to confirm the destination of the transmission target data related to the transmission job. In other words, the confirmation request process is executed to request the user to confirm the destination of the transmission target data related to the transmission job as a confirmation related to the transmission job.

FIG. 6 is a diagram illustrating the confirmation screen 310 (300) used to request a user to confirm a destination of transmission target data (scan data) related to an e-mail transmission job. On the confirmation screen 310, a destination mail address set by the user (the user U1) in an e-mail transmission job setting operation (step S13 (FIG. 4)) is displayed. Further, the confirmation screen 310 displays a "confirmation" button 311 that accepts a confirmation completion operation indicating an intention that the destination of the transmission target data is confirmed (that a correct destination is set) and a "change" button 312 to make a change (a modification) in the setting of the destination of the transmission target data. Then, on the confirmation screen 310, the user U1 confirms whether the correct destination of the transmission target data (the scan data in this example) is being set.

For example, when the user U1 confirms the destination of the scan data on the confirmation screen 310 and judges that the correct destination is set (specified), the user U1 presses the "confirmation" button 311 on the confirmation screen 310.

When a confirmation completion operation indicating an intention that the confirmation of the destination of the transmission target data (the scan data) is completed is given by the user U1 (when a pressing operation on the "confirmation" button 311 is accepted), the confirmation request process related to the transmission job (the e-mail transmission job in this example) (step S32 (S19)) ends.

Then, the process proceeds to step S33, it is decided to transmit the transmission target data (the scan data in this example) which is being held, and the scan data is transmitted to the destination set by the user U1 (step S20 (FIG. 4)).

On the other hand, when the user U1 checks the destination of the scan data on the confirmation screen 310 and finds that a wrong destination is set, the user U1 presses the "change" button 312 on the confirmation screen 310.

When the pressing operation on the "change" button 312 is accepted, setting related to the e-mail transmission job is performed again. Concretely, a setting screen (not illustrated) of the e-mail transmission job is displayed on the touch panel 25 of the MET 10 again. Then, on the setting screen, the user U1 makes a change related to the destination of the transmission target data. More specifically, on the setting screen, the user U1 modifies the wrong destination to a correct destination (deletes the wrong destination and redefines a correct destination).

After that, when the modification (redefining) of the setting related to the e-mail transmission job is completed, the user U1 gives an e-mail transmission job execution instruction again by pressing a start button (not illustrated) on the operation panel unit 6c. When the execution instruction is given by the user U1 again, the confirmation screen 310 (see FIG. 6) is displayed on the touch panel 25 of the MFP 10.

On the confirmation screen 310 which is displayed again, the user U1 confirms the destination of the transmission target data (scan data) again and presses the "confirmation" button 311 when it is judged that a correct destination is being set. Then, when a confirmation completion operation indicating that the confirmation of the transmission target data is completed is given by the user U1, it is decided that the transmission of the transmission target data which is being held needs to be executed (step S33) and the transmission target data is transmitted to the destination set (redefined) by the user U1 (step S20 (FIG. 4)).

After that, the user U1 performs a log-out operation and, in response to the log-out operation, the MFP 10 executes a log-out process (step S21).

As described above, according to the first embodiment, when it is determined that the user who gives the transmission job execution instruction is in an off-normal state, the user is requested to make a confirmation related to the transmission job. In other words, when it is determined that the user who has given the transmission job execution instruction is a user in a mentally unstable state (a user who is likely to make a mistake related to the transmission job), the user is requested to make a confirmation related to the transmission job. This can prevent an occurrence of a mistake by the user related to the transmission job.

Here, it may be considered that the confirmation request process is executed every time when a transmission job is executed, regardless of the state of the user, in a normal state or an off-normal state. However, in a case where the confirmation request process is always executed when a transmission job is executed, it is not always preferable since the work efficiency may be reduced even though the occurrence of the mistake related to the transmission job by the user may be suppressed.

In view of the above, according to the first embodiment, when it is determined that the user U1 who has given the transmission job execution instruction is in a normal state, the transmission of the transmission target data is immediately executed without executing the confirmation request process. On the other hand, when it is determined that the user U1 is in an off-normal state, transmission of the transmission target data is not immediately executed and a confirmation request process is executed. In other words, a confirmation related to the transmission job is not requested to a user who is mentally stable (a user who is not likely to make a mistake related to the transmission job), and a confirmation related to the transmission job is requested only to a user who is mentally stable (a user who is likely to make a mistake related to the transmission job). Thus, an occurrence of a mistake related to the transmission job by the user can be suppressed while suppressing the reduction of user's work efficiency.

Here, according to the first embodiment, in the confirmation request process (step S32), the user is requested to confirm one confirmation item (the destination of the transmission target data related to the transmission job in this example) related to the transmission job; however, this does not set any limitation and, in the confirmation request process, the user may be requested to confirm a plurality of confirmation items related to the transmission job. For example, in the confirmation request process, the user may be requested to confirm two confirmation items including the destination of the transmission target data related to the transmission job and the transmission target data itself (whether or not correct transmission target data is being specified).

2. Second Embodiment

A second embodiment is a modification example of the first embodiment. In the following, a difference from the first embodiment will be mainly explained.

The first embodiment has described that, when it is determined that the user who has given the transmission job execution instruction is in an off-normal state, a confirmation request process to request a confirmation of M number (one, for example) of confirmation items related to the transmission job is always executed regardless of the level of the user's off-normal state.

Here, when it is determined that the user who has given the transmission job execution instruction is in an off-normal state, it may be considered that the possibility of an occurrence of a mistake by the user related to the transmission job may differ according to the level of the user's off-normal state (also referred to as an off-normal level).

For example, when the heart rate of the user in an off-normal state is greater than a predetermined threshold value TH2 (a value (a value "100" for example) greater than the threshold value TH1 (a value "80" for example)), it may be considered that the user has a significantly poor concentration and the possibility of an occurrence of a mistake by the user related to the transmission job is relatively high, compared to a case where the heart rate of the user is smaller than the threshold value TH2. In other words, when the off-normal level of the user in an off-normal state is greater than a predetermined level, it may be considered that the possibility of an occurrence of a mistake by the user related to the transmission job is relatively high, compared to a case where the off-normal level is smaller than the predetermined level. On the other hand, when the off-normal level of the user is smaller than the predetermined level (when the heart rate is smaller than the threshold value TH2 for example), a possibility of an occurrence of a mistake by the user related to the transmission job is relatively low, compared to a case where the off-normal level is larger than the predetermined level.

In view of the above, according to the second embodiment, when it is determined that the user who has given the transmission job execution instruction is in an off-normal state, a confirmation request process of a type according to the user's off-normal level is executed. More specifically, when it is determined that the user who has given the transmission job execution instruction is in an off-normal state and the off-normal level of the user is smaller than the predetermined level, a first type confirmation request process is executed. On the other hand, when it is determined that the user is in an off-normal state and the off-normal level of the user is greater than the predetermined level, a second type confirmation request process is executed. In the second type confirmation request process, the user is requested to confirm more confirmation items, compared to the confirmation items to be requested to the user in the first type confirmation request process.

In the following, the above described manner will be described in more detail.

In the second embodiment, each process of FIG. 4 is executed similarly to the first embodiment. Here, according to the second embodiment, the process content of the confirmation request process (step S19) is different from the process content of the confirmation request process in the first embodiment.

Figure 7:
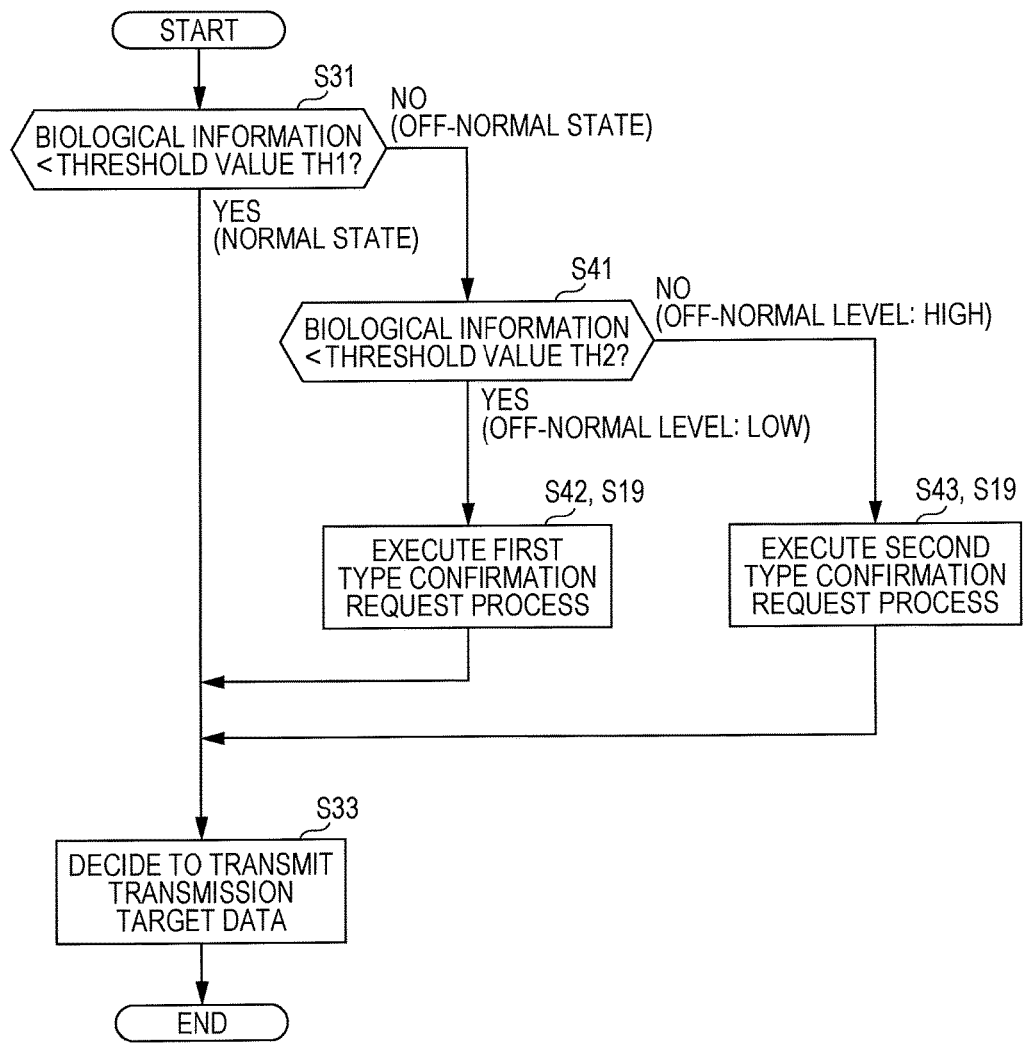
FIG. 7 is a flowchart related to a user state determination process or the like according to a second embodiment.

Concretely, according to the second embodiment, a flowchart of FIG. 7 is used as substitute for the flowchart of FIG. 5. In the second embodiment, processes in steps S41 to S43 are executed as substitute for the process in step S32 in FIG. 5. Here, the process content in steps other than steps S41 to S43 of FIG. 7 is similar to that of the first embodiment.

More specifically, when it is determined that the user (the user U1 for example) who has given the transmission job (the e-mail transmission job, for example) execution instruction is in an off-normal state in step S31, the process proceeds to steps S41 to S43. Here, similarly to the first embodiment, when it is determined that the user U1 is in a normal state in step S31, it is decided that the transmission of the transmission target data needs to be immediately executed in step S33 and the transmission target data is transmitted to the destination set by the user U1 (step S20 (FIG. 4)).

In steps S41 to S43, it is determined which is larger between the off-normal level (off-normal state level) of the user U1 in an off-normal state and the predetermined threshold value TH2 (a predetermined reference value), and a type of confirmation request process according to the off-normal level is executed. Here, between the two types of confirmation request processes, a type of the confirmation request process according to the off-normal level of the user U1 is executed.

Firstly, in step S41, the MFP 10 determines which is larger between the off-normal level of the user U1 and the threshold value TH2. Concretely, the biological information (the heart rate in this example) acquired in steps S15 to S17 is used as it is as an index value indicating the off-normal level of the user U1. Then, it is determined which is larger between the index value (the heart rate in this example) and the threshold value TH2 (a value "100" for example). Here, in this example, a value ("100" (=80+20)) in which a predetermined value "20" is added to the threshold value TH1 (a value "80" in this example (=a typical heart rate "60"+a predetermined value "20") (see the first embodiment)) is used as the threshold value TH2.

For example, when it is determined that the acquired heart rate (the heart rate of the user U1) is smaller than the threshold value TH2 in step S41, it is determined that the off-normal level of the user U1 is smaller than a predetermined level and the process proceeds to step S42.

In step S42, the first type confirmation request process (described later) is executed.

In the first type confirmation request process, the user (the user who has given the transmission job execution instruction) is requested to confirm M number (M is a natural number) (M=1 in this example) of confirmation items related to the transmission job. The M number of confirmation items to be requested to the user to confirm in the first type confirmation request process is relatively small (compared to N number of confirmation items requested to confirm in the later described second type confirmation request process). Here, in the first type confirmation request process, the user is requested to confirm one confirmation item related to the transmission job (the destination of the transmission target data according to the transmission job).

Concretely, the MFP 10 displays the confirmation screen 310 (see FIG. 6) to request the user to confirm the destination of the transmission target data (scan data) related to the e-mail transmission job on the touch panel 25 of the MFP 10. Then, the MFP 10 requests the user to make a confirmation related to the transmission job (specifically, the confirmation of the destination of the transmission target data) by using the confirmation screen 310. Here, the confirmation of the transmission target data destination (the confirmation by the user U1) is performed similarly to the first embodiment.

After that, when the confirmation completion operation indicating an intention that the confirmation of the scan data destination is completed is given by the user U1 (when a pressing operation on the "confirmation" button 311 is accepted) on the confirmation screen 310, the first type confirmation request process (step S42) ends and the process proceeds to step S33. Then, it is decided that the transmission of the transmission target data (scan data) which is being held needs to be executed (step S33), and the scan data is transmitted to the destination set by the user U1 (step S20 (FIG. 4)).

In this manner, even when the user who has given the transmission job execution instruction is in an off-normal state, the M number (M=1 in this example), which is relatively small, of confirmation items are requested to the user to confirm (compared to the N number of confirmation items in the second type confirmation request process described later) when the off-normal level of the user is smaller than the predetermined level.

On the other hand, when it is determined that the acquired heart rate (the heart rate of the user U1) is larger than the threshold value TH2 in step S41, it is determined that the off-normal level of the user U1 is larger than the predetermined level, and the process proceeds to step S43. Here, in this example, in a case where the heart rate is equal to the threshold value TH2, it is determined as the off-normal level of the user U1 is larger than the predetermined level. However, this does not set any limitation and, when the heart rate is equal to the threshold value TH2, it may be determined as the off-normal level of the user U1 is smaller than the predetermined level.

In step S43, the second type confirmation request process (described later) is executed.

In the second type confirmation request process, the user (the user who has given the transmission job execution instruction) is requested to confirm N number (N is a natural number, N>M) of confirmation items related to the transmission job. The number N of the confirmation items to be requested to the user to make confirmation in the second type confirmation request process is relatively large (compared to the number M (M=1 in this example) of the confirmation items to be requested to the user to confirm in the first type confirmation request process (step S42)). In other words, to the user in an off-normal level which is greater than the predetermined level, a relatively larger number of confirmation items are requested to be confirmed, compared to the number of the confirmation items to be requested to the user in an off-normal level which is smaller than the predetermined level.

Here, as described above, when the user makes a mistake of transmitting the transmission target data to a wrong destination, it may be considered a problem that confidential information or the like is leaked in addition to a problem that the receiver (who is not the original receiver) of the transmission target data is made confused. Further, when the user makes a mistake of transmitting wrong transmission target data, it may be considered a problem that confidential information or the like is leaked in addition to a problem that the receiver who received the wrong transmission target data is made confused. Further, when the user makes a mistake of leaving the original in the MFP 10 (on an original discharge tray or a flat glass) in a transmission job including a scan process, a next user who uses MFP 10 may see the content of the original and confidential information or the like may be leaked.

To prevent an occurrence of the above mistakes related to the transmission job, in this example, the user is requested to confirm three confirmation items related to the e-mail transmission job (the transmission target data destination, the transmission target data itself, and the remained original prevention) in the second type confirmation request process.

Concretely, in the second type confirmation request process (step S43), the user U1 is requested to confirm the three confirmation items related to the e-mail transmission job sequentially. More specifically, among the three confirmation items, the confirmation of the transmission target data destination is firstly requested to the user U1, the confirmation of the transmission target data itself is then requested to the user U1, and the confirmation to prevent the original from being remained is requested to the user U1 at last.

Firstly, the confirmation screen 310 (see FIG. 6) is displayed on the touch panel 25 of the MFP 10, and the confirmation of the transmission target data (scan data) destination related to the e-mail transmission job is requested to the user U1. Here, the confirmation of the transmission target data destination related to the e-mail transmission job is performed similarly to the first embodiment (the first type confirmation request process (step S42)).

After that, in the confirmation screen 310, when the confirmation completion operation indicating an intention that the transmission target data destination has been confirmed is given by the user U1 (when a pressing operation on the "confirmation" button 311 is accepted), a confirmation of the transmission target data itself is secondly requested to the user U1. In other words, a confirmation request process to request the user to make a confirmation related to the transmission job, which is a confirmation of the transmission target data itself related to the transmission job, is executed.

Figure 8:
FIG. 8 is a diagram illustrating a confirmation screen.
Figure 8:
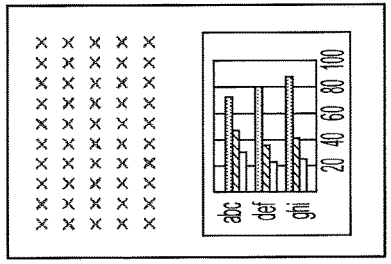
Figure 8:

FIG. 8 is a diagram illustrating a confirmation screen 320 used to request the user to confirm the transmission target data itself related to the transmission job. On the confirmation screen 320, the transmission target data (scan data of the original read in response to the e-mail transmission job execution instruction, in this example) is displayed. Further, the confirmation screen 320 displays a "confirmation" button 321 to accept a confirmation completion operation indicating an intention that the confirmation of the transmission target data is completed (that scan data of a correct original is set), and a "change" button 322 to change (modify) the transmission target data itself. Then, the user U1 confirms the transmission target data itself (whether or not the scan data of the correct original is being set as the transmission target data) on the confirmation screen 320.

For example, when the user U1 confirms the scan data on the confirmation screen 320 and determines that the scan data of the correct original is set as the transmission target data, the user U1 presses the "confirmation" button 321 on the confirmation screen 320.

On the other hand, the user U1 confirms the scan data on the confirmation screen 320 and finds that scan data of a wrong original is set as the transmission target data, the user U1 presses the "change" button 322 on the confirmation screen 320.

When a pressing operation on the "change" button 322 is accepted, setting related to the e-mail transmission job ("scan data attached e-mail transmission job" in this example) is executed again. Then, the user U1 removes the wrong original from the MFP 10 (the ADF or the flat glass), places a correct original to the MFP 10, and gives the e-mail transmission job execution instruction again.

When the e-mail transmission job execution instruction is given again, the confirmation screen 310 (see FIG. 6) is displayed on the touch panel 25 of the MFP 10 again. When the user U1 confirms the transmission target data destination on the confirmation screen 310 which is displayed again, the confirmation screen 320 (see FIG. 8) is displayed again on the touch panel 25 of the MFP 10.

Then, the user U1 confirms the transmission target data (the scan data of the new original) on the confirmation screen 320 and determines that the scan data of the correct original is being set as the transmission target data, the user U1 presses the "confirmation" button 321 on the confirmation screen 320.

When a confirmation completion operation indicating an intention that the confirmation of the transmission target data (scan data) is completed is given by the user U1 (when a pressing operation on the "confirmation" button 321 is accepted), the MFP 10 thirdly requests the user U1 to confirm to prevent the original from being remained. In other words, a confirmation request process to request the user to confirm to prevent the original related to the transmission job from being remained, as a confirmation related to the transmission job is executed in advance (before transmitting the transmission target data).

FIG. 9 is a confirmation screen 330 to request the user to confirm to prevent the original related to the e-mail transmission job from being remained (prior confirmation). The confirmation screen 330 displays a "confirmation" button 331 to accept a confirmation completion operation indicating an intention that the original on the original discharge tray or flat glass has been removed (a confirmation that the original is not remained is completed).

Before transmitting the transmission target data related to the e-mail transmission job, the user U1 presses the "confirmation" button 331 on the confirmation screen 330 after removing the original read in response to the e-mail transmission job execution instruction from the original discharge tray (or the flat glass). A confirmation completion operation indicating an intention that the confirmation to prevent the original from being remained is completed is given by the user U1 (when a pressing operation on the "confirmation" button 331 is accepted), the second type confirmation request process (step S43) ends in response to the completion of the confirmation (confirmation by the user U1) of all the three confirmation items in the second type confirmation request process.

Then, the process proceeds to step S33, it is determined that the transmission target data (scan data in this example) needs to be transmitted, and the scan data is transmitted to the destination set by the user U1 (step S20 (FIG. 4)).

As described above, according to the second embodiment, when it is determined that the user who has given the transmission job execution instruction is in an off-normal state, a type of the confirmation request process according to the user's off-normal level is executed.

Concretely, when it is determined that the user is in an off-normal state and the user's off-normal level is smaller than the predetermined level, the user is requested to confirm the M number (M=1 in this example), which is relatively small, of the confirmation items (compared to the N number (N=3 in this example) of confirmation items in the second type confirmation request process). In other words, in a case where the user who is in an off-normal state but the off-normal level is smaller than the predetermined level, a confirmation of confirmation items fewer than the N number of confirmation items of a case where the off-normal level is greater than the predetermined level is requested. In short, although the user is requested to make a confirmation related to the transmission job, only relatively small number of confirmation items is to be confirmed. Thus, an occurrence of a mistake by the user related to the transmission job can be suppressed while preventing user's work efficiency from being significantly reduced.

Further, when it is determined that the user is in an off-normal state and the user's off-normal level is greater than the predetermined level, the user is requested to confirm the N number (N=3 in this example), which is relatively large, of the confirmation items (compared to the M number (M=1 in this example) of the confirmation items in the first type confirmation request process). In other words, to the user whose off-normal level is greater than the predetermined level, a confirmation of more confirmation items is requested compared to the M number of the confirmation items of a case where the off-normal level is smaller than the predetermined level. This can further suppress an occurrence of a mistake by the user related to the transmission job.

Here, according to the second embodiment, the confirmation item (the transmission target data destination in this example) in the first type confirmation request process (step S42) overlaps with a part of the confirmation items in the second type confirmation request process (step S43); however, this does not set any limitation. For example, the confirmation item in the first type confirmation request process may not overlap with any of the confirmation items in the second type confirmation request process. In other words, in the first type confirmation request process and second type confirmation request process, a confirmation of confirmation items which are different from one another may be requested to the user.

3. Third Embodiment

A third embodiment is a modification example of the first embodiment. In the following, a difference from the first embodiment is mainly explained.

According to the first embodiment, the threshold value TH1 (a reference value used in a process to determine whether the state of the user is in a normal state or an off-normal state (step S31)) is fixed; however, it is not limited to this configuration and the threshold value TH1 may be reduced when a predetermined condition related to a change rate during the confirmation request process is satisfied.

In this example, when a fixed value (a value "80" for example) which is defined in advance is used as the threshold value TH1, the user's state (whether the user is in a normal state or an off-normal state) of some users cannot be determined correctly.

For example, even when the heart rate of the user is smaller than the threshold value TH1 (the fixed value "80"), the user may have a relatively high possibility to make a mistake related to the transmission job (compared to a case of being in a normal state) in a case where the heart rate is a value (a value "75" for example) which is relatively close to the fixed value "80." Particularly, a user who has made a relatively large number of changes related to the setting content of the transmission job in a confirmation request process is considered to have a high possibility to make a mistake related to the transmission job in a case where the heart rate is equal to or greater than a value TH11 (which is a value smaller than the fixed value TH1 by a certain value) and smaller than the fixed value TH1, as well as the case where the heart rate of the user is equal to or greater than the threshold value TH1.

In view of the above circumstance, according to the third embodiment, regarding a user who has made a relatively large number of changes related to the setting content of a transmission job in a confirmation request process, a determination reference (the threshold value TH1) to determine whether the user's state is in a normal state or an off-normal state is lowered.

Concretely, the MFP 10 stores, for each user, a number of executions P1 of how many times the confirmation request process has been executed and a number of changes Q1 of how many times a change related to the setting content of the transmission job has been made in the confirmation request process. Here, the number of executions P1 and the number of changes Q1 of each user may be stored in a device other than the MFP 10 (a server for example), without limiting to the MFP 10.

Figure 10:
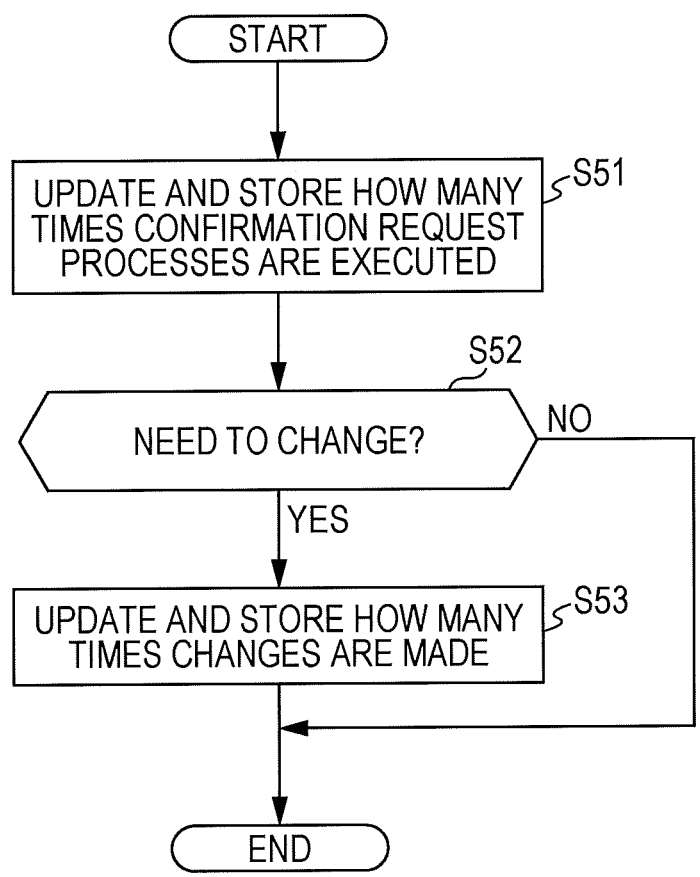
FIG. 10 is a flowchart related to a process to count how many times a confirmation request process has been executed and how many times changes have been made in the confirmation request process.

FIG. 10 is a flowchart related to a count process of how many times the confirmation request process has been executed and how many times changes have been made in the confirmation request process. Here, also according to the third embodiment, similarly to the first embodiment, each process in FIG. 4 and each process in FIG. 5 are performed respectively.

For example, in a case where a certain transmission job is executed and it is determined that a user who has given an execution instruction of the certain transmission job (user U1 for example) is in an off-normal state in step S31 (FIG. 5), a confirmation request process is executed (step S32). When the confirmation request process is executed for the user U1, the processes of FIG. 10 are executed in a separate routine from the processes of FIGS. 4 and 5.

Concretely, when the confirmation request process (step S32) is executed for the user U1, the MFP 10 updates the number of executions P1 of the confirmation request process executed for the user U1 and stores the updated number in the MFP 10 (step S51).

Then, in step S52, the MFP 10 determines whether or not the user U1 has made a change related to the setting content of the certain transmission job in the confirmation request process.

For example, in a case where the user U1 notices that a wrong destination of the transmission target data related to the transmission job has been set in the confirmation request process and makes a change of the destination, the process proceeds to step S53.

In step S53, the MFP 10 updates the number of changes Q1 related to the setting content of the transmission job made in the confirmation request process executed for the user U1 (the number of changes related to the user U1) and stores the updated number in the MFP 10.

On the other hand, when a change related to the setting content of the certain transmission job is not made by the user U1 in the confirmation request process, the processes of the FIG. 10 ends without executing step S53. In other words, the number of changes Q1 related to the user U1 is not updated.

Such actions (actions of counting and storing the number of executions P1 of the confirmation request process and the number of changes Q1 made in the confirmation request process) are performed for each user, and the number of executions P1 and the number of changes Q1 are stored in the MFP 10.

The number of executions P1 and the number of changes Q1 stored (saved) in the MFP 10 for each user are used as follows.

Concretely, based on the number of executions P1 and the number of changes Q1 for each user, a threshold value TH1 for a user can be set.

More specifically, the MFP 10 calculates a change rate R1 of the user U1 by, for example, dividing the number of changes Q1 made related to the setting content of the transmission job during the confirmation request process related to the user U1 with the number of executions P1 of the confirmation request process executed for the user U1. In other words, for the user U1, a rate of the number of changes Q1 (change rate R1) with respect to the number of executions P1 of the confirmation request process is calculated. Then, the MFP 10 determines whether or not the change rate R1 (=Q1/P1) calculated for the user U1 is higher than a predetermined rate (20% for example). In short, it is determined whether or not a change frequency (a frequency of making changes related to the setting content of the transmission job) of the user U1 during the confirmation request process is higher than a certain level.

When the change rate R1 of the user U1 is higher than the predetermined rate, the MFP 10 lowers the threshold value TH1 (reference value) of the user U1. Here, the threshold value TH1 (=TH10) (a value "80" for example), which is not lowered, is lowered to a value TH11 (a value "70" (=80-10)), which is smaller than the threshold value TH10 by a certain value (a value "10" for example). After that, when the user U1 gives a transmission job execution instruction again, a process to determine the user's state by comparing biological information of the user U1 with the new threshold value TH1 (the reduced threshold value TH1) (=TH11) is executed in step S31 (FIG. 5).

On the other hand, when the change rate R1 of the user U1 is lower than the predetermined rate, the threshold value TH1 is not changed and the process to determine the user's state is performed by continuously using the predetermined threshold value TH1 (a value "80" for example) in step S31.

In this manner, according to the third embodiment, when the user's change rate R1 in the confirmation request process is higher than the predetermined rate, the threshold value TH1 of the user is lowered. In other words, regarding a user who has made a relatively large number of changes related to the transmission job setting content in the confirmation request process, the threshold value TH1 used in a subsequent user state determination process (step S31) is lowered. As a result, in a subsequent user state determination process related to the user, for example, even when the user's heart rate is smaller than the lowered threshold value TH1 (TH10), it is determined that the user is in an off-normal state when the heart rate is greater than the lowered threshold value TH1 (TH11). Thus, by setting a more preferable threshold value TH1 for the user, the state of the user can be correctly determined. In other words, the setting of the determination reference (threshold value TH1) related to whether or not the confirmation request process is executable can be set more flexibly.

Further, as a result of lowering the threshold value TH1 related to the user who has made a relatively large number of changes of the setting content of the transmission job in the confirmation request process, a chance (a case) that the user is requested to make a confirmation related to the transmission job may increase. Thus, regarding the user, an occurrence of a mistake related to the transmission job can be further suppressed.

Here, the third embodiment has been explained as a modification example of the first embodiment; however, this does not set any limitation and the scope of the third embodiment may be applied to the second embodiment and the following actions may be performed.

For example, when one of the first type confirmation request process (step S42 (FIG. 7)) and the second type confirmation request process (step S43) is executed regarding the execution of a certain transmission job given by the user U1, the number of executions P1 of the confirmation request process executed for the user U1 is updated and stored in the MFP 10 (step S51 (FIG. 10)). In other words, the number of executions P1 of the entire confirmation request process (steps S42 and S43) executed for the user U1 is updated and stored in the MFP 10.

Then, when a change of the destination of the transmission target data is made by the user U1 in the confirmation request process (step S42 or S43), the process proceeds to step S52 and then step S53.

In step S53, the number of changes Q1 made related to the setting content of the transmission job of the entire confirmation request process (steps S42 and S43) executed for the user U1 is updated and stored in the MFP 10.

Then, the threshold value TH1 for each user can be set based on the number of executions P1 and the number of changes Q1 (the number of executions P1 and the number of changes Q1 of each user) stored (saved) in the MFP 10.

Concretely, the MFP 10 calculates a change rate R1 (=Q1/P1) of the user U1 for example. Then, it is determined whether the calculated change rate R1 of the user U1 is higher than a predetermined rate and, when the change rate R1 is higher than the predetermined rate, the threshold value TH1 (reference value) of the user U1 is lowered.

In this manner, by applying the scope of the third embodiment to the second embodiment, a process to lower the threshold value TH1 may be executed.

4. Fourth Embodiment

A fourth embodiment is a modification example of the second embodiment. In the following, a difference from the second embodiment will be mainly explained.

In the second embodiment, the threshold value TH2, which is used in a process to determine the user's off-normal level (step S41 (FIG. 7)) is fixed; however, this does not set any limitation and the threshold value TH2 may be lowered in a case where a predetermined condition related to the change rate in the second type confirmation request process (step S43) is satisfied.

In this example, when a previously set fixed value (a value "100" for example) is used as the threshold value TH2, the off-normal level may not be correctly determined in case of some users.

For example, even when the heart rate of the user in an off-normal state is smaller than the threshold value TH2 (fixed value "100"), if the heart rate is a value (a value "95" for example), which is relatively close to the fixed value "100," some user may have a relatively high possibility of making a mistake relate to the transmission job (compared to a case where the off-normal level is lower than the predetermined level). Especially, a user who has made a relatively large number of changes related to the setting content of the transmission job in the second type confirmation request process, the user may be considered to have a relatively high possibility of making a mistake related to the transmission job in a case where the heart rate is equal to or greater than a value TH21 (a value smaller than the fixed value TH2 by a certain value) and smaller than the fixed value TH2, in addition to a case where the heart rate is equal to or greater than the threshold value TH2.

In view of the above, according to the fourth embodiment, regarding a user who has made a relatively large number of changes related to the setting content of the transmission job in the second type confirmation request process (step S43), the determination reference (threshold value TH2) used to determine whether the off-normal level is relatively high or relatively low is lowered.

Concretely, the MFP 10 stores, for each user, a number of executions P2 of how many times the second type confirmation request process (step S43) has been executed and the number of changes Q2 made related to the setting content of the transmission job in the second type confirmation request process. Here, the number of executions P2 and number of changes Q2 of each user may not be stored in the MFP 10 but be stored in a device other than the MET 10 (a server, for example).

Also in the fourth embodiment, each process of FIG. 7 may be performed respectively, similarly to the second embodiment. Further, in the fourth embodiment, each process of FIG. 10 is performed respectively, similarly to the third embodiment.

For example, when the second type confirmation request process related to the user U1 (step S43) is executed in an execution of a certain transmission job given by the user U1, the number of executions P2 of the second type confirmation request process related to the user U1 is updated and stored in the MFP 10 (step S51). Further, when a change related to the setting content of the certain transmission job is made in the second type confirmation request process executed related to the user U1, the process proceeds to step S52 and then step S53 and the number of changes Q2 related to the user U1 is updated and stored in the MFP 10.

Then, the threshold value TH2 of each user can be set based on the number of executions P2 and number of changes Q2 of each user.

For example, the MFP 10 calculates a change rate R2 of the user U1 by dividing the number of changes Q2 made related to the setting content of the transmission job in the second type confirmation request process executed related to the user U1 with the number of executions P2 of the second type confirmation request process. In other words, related to the user U1, the rate of the number of changes Q2 respect to the number of executions P2 of the second type confirmation request process (change rate R2) is calculated. Then, the MFP 10 determines whether or not the change rate R2 (=Q2/P2) calculated related to the user U1 is higher than the predetermined rate (20% for example). In short, it is determined whether or not a change frequency by the user U1 in the second type confirmation request process (frequency of the changes related to the setting content of the transmission job) is greater than a certain level.

For example, when the change rate R2 of the user U1 is greater than the predetermined rate, the MFP 10 lowers the threshold value TH2 of the user U1. Here, the unlowered threshold value TH2 (=TH20) (a value "100" for example) is lowered to be a value TH21 (a value "90" (=100−10)), which is smaller than the threshold value TH20 by a certain value (a value "10" for example). After that, when the user U1 givens a transmission job execution instruction again, in step S41 (FIG. 7), the off-normal level of the user U1 is determined by comparing the biological information of the user U1 and the new threshold value TH2 (the lowered threshold value TH2) (=TH21).

On the other hand, when the change rate R2 of the user U1 is lower than the predetermined rate, the threshold value TH2 is not changed and the predetermined threshold value TH2 (a value "100" in this example) is continuously used to determine the off-normal level of the user in step S41.

In this manner, according to the fourth embodiment, the change rate R2 of the user in the second type confirmation request process is higher than the predetermined rate, the threshold value TH2 of the user is lowered. In other words, regarding a user who has made a relatively large number of changes related to the setting content of the transmission job in the second type confirmation request process, the threshold value TH2 used in a subsequent off-normal level determination process (step S41) is lowered. As a result, for example, even when the heart rate of the user is lower than the unlowered threshold value TH2 (TH20) in the subsequent off-normal level determination process related to the user, if the heart rate is greater than the unlowered threshold value TH2 (TH21), it is determined that the off-normal level of the user is greater than the predetermined level. Thus, related to the user, by setting a more preferable threshold value TH2, the off-normal level of the user can be correctly determined. In other words, setting of the determination reference (threshold value TH2) to determine which of the first type confirmation request process or the second type confirmation request process is to be executed can be more flexibly performed.

Further, as a result that the threshold value TH2 related to the user who has made a relatively large number of changes related to the setting content of the transmission job in the second type confirmation request process is lowered, a chance (a case) of executing the second type confirmation request process to the user may increase. Thus, regarding the user, an occurrence of a mistake by the user related to the transmission job can be further suppressed.

5. Modification Example and the Like

The embodiments of the present invention have been explained; however, the present invention is not limited to what is described above.

Modification Example Related to Biological Information to be Used

For example, according to the above embodiments and the like, a heart rate of a user is used in the user state determination process (step S31) (also, in an off-normal level determination process (step S41) in the second embodiment); however, this does not set any limitation. Concretely, biological information (a blood pressure and the like) other than the heart rate may be used in the user state determination process (or the off-normal level determination process).

Further, according to the above embodiments and the like, a single type of biological information (only the heart rate, for example) is used in the user state determination process (and the off-normal level determination process); however, this does not set any limitation and a plurality of types of biological information may be used in the user state determination process (and the off-normal level determination process).

For example, a plurality of types of biological information (for example, a heart rate and a blood pressure) may be acquired from the wearable terminal 50 of the user and an index value that indicates a state of the user may be calculated (estimated) in the MFP 10 based on the acquired plurality of types of biological information by using various technology to acquire as new biological information related to the user. Then, the user state determination process (step S31) may be executed based on a comparison between the acquired index value and the threshold value TH1. Further, in the second embodiment and the like, the off-normal level determination process (step S41) may be executed based on a comparison between the acquired index value and the threshold value TH2.

Modification Example Related to Acquisition Route of Biological Information

Further, in the above embodiments and the like, the MFP 10 acquires biological information measured by the wearable terminal 50 worn by the user (directly) from the wearable terminal 50 via communication with the wearable terminal 50 (steps S15 to S17 (FIG. 4)); however, this does not set any limitation.

For example, the MFP 10 may acquire biological information, which is measured by the wearable terminal 50 worn by the user and transferred and stored in a server 80 (a cloud server, for example), (indirectly) from the server 80 via communication with the server 80.

Figure 11:
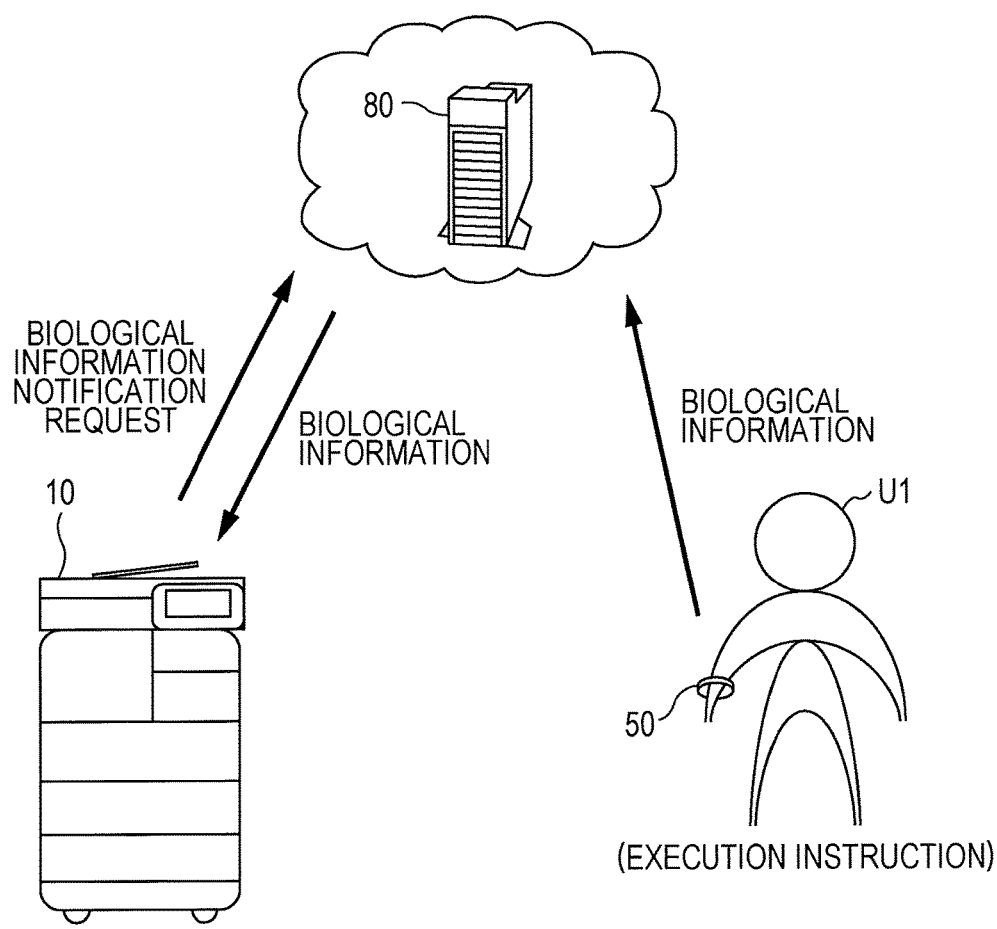
FIG. 11 is a diagram illustrating a manner that an information processing device (MFP) acquires biological information via a server.

FIG. 11 is a diagram illustrating such an altered example.

In this altered example, the wearable terminal 50 of the user (the user U1 for example) periodically transmits (transfers) biological information measured by the wearable terminal 50 to the server 80 regardless of a presence of a transmission request from the MFP 10. The server 80 stores the received biological information as distinguishing the biological information of each user.

On the other hand, the MET 10 performs actions basically similarly to FIG. 4 and the like. Here, the MFP 10 transmits a transmission request of the biological information of the user U1 (a biological information notification request (step S15)) to the server 80, not to the wearable terminal 50. The transmission request includes information of the user U1 (a user ID, a password, and the like), and specification information and the like for specifying a desired point of time of measuring biological information to be transmitted. For example, when the transmission job execution instruction is given from the user U1, the information of the user U1 and specification information that specifies the point of time when the execution instruction is given as the desired point of time of measuring are transmitted from the MFP 10 to the server 80.

When the transmission request is received, the server 80 extracts the biological information of the user U1, which is measured at the time corresponding to the desired point of time of measuring specified in the specification information (for example, within a certain period of time including the desired point of time of measuring, for example) from the biological information (the biological information acquired from the wearable terminal 50 every certain period of time period and stored, for example) stored in the server 80, in response to the transmission request. Then, the server 80 transmits the extracted biological information to the MFP 10. The MFP 10 acquires the biological information of the user U1 (in detail, biological information corresponding to the point of time when the execution instruction is given by the user U1) by receiving the biological information from the server 80 and executes a user state determination process based on the received biological information (step S18 (S31)).

In such a manner, the MET 10 can acquire the biological information of the user (U1).

Modification Example Related to Executing Body of Each Process

Further, according to the above embodiments and the like, the MFP 10 executes the user state determination process (step S31); however, this does not set any limitation and a device other than the MFP 10 (the server 80, for example) may execute the user state determination process (step S31).

Concretely, the biological information of the user who has given the transmission job execution instruction is directly transmitted from the wearable terminal 50 to the server 80 (or via the MFP 10), and the server 80 acquires the biological information of the user. In response to the execution instruction given by the user, the MFP 10 transmits an execution request of a user state determination process to the server 80. Then, in response to the execution request from the MFP 10, the server 80 determines whether the user is in a normal state or an off-normal state based on the acquired biological information and transmits the user state determination result to the MFP 10. When the determination result is acquired from the server 80, the MFP 10 controls the execution of the transmission job according to the user state determination result. For example, when a determination result that the user is in a normal state is acquired, it is decided that the transmission of the transmission target data related to the transmission job needs to be immediately executed. Further, when a determination result that the user is in an off-normal state is acquired, a confirmation request process is executed in the MFP 10.

In this manner, the user state determination process may be executed in a device other than the MFP 10 (the server 80, for example).

Further, in the second embodiment and the like, not only the user state determination process but also the off-normal level determination process (step S41) may be executed in a device other than the MFP 10 (the server 80, for example). Then, for example, a determination result of the off-normal level determination process (step S41) executed in the server 80 may be transmitted from the server 80 to the MFP 10 and the confirmation request process of a type corresponding to the user's off-normal level may be executed in the MFP 10. Here, it is not limited to the above and the user state determination process and the off-normal level determination process may be executed in a device different from the MFP 10 and server 80.

Further, in the third and fourth embodiments, and the like, the MFP 10 performs a process of setting (lowering) the threshold values TH1 and TH2; however, this does not set any limitation and a device other than the MFP 10 (the server 80, for example) may perform the process to set (lower) the threshold values TH1 and TH2.

Modification Example Related to Information Processing Device

Further, in the above respective embodiments and the like, the MFP 10 performs each process of FIG. 4 and the like as the information processing device 100; however, this does not set any limitation and a personal computer 30 may perform each process of FIG. 4 and the like as the information processing device 100.

Figure 12:
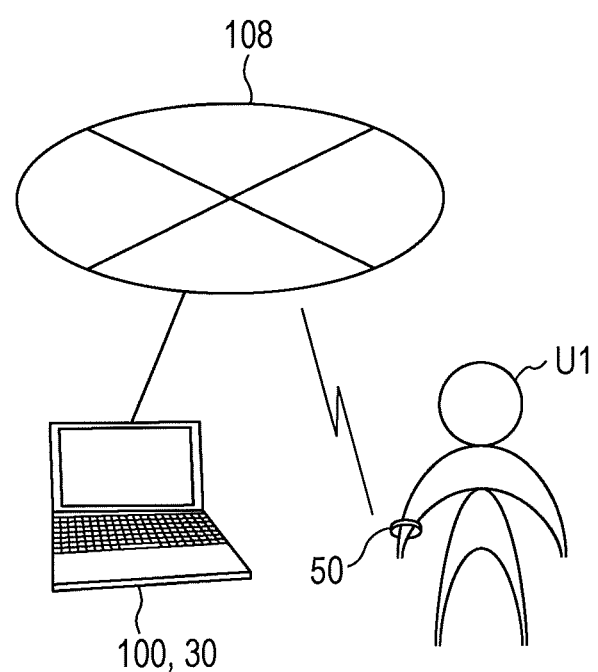
FIG. 12 is a diagram illustrating an information processing system according to a modification example.

FIG. 12 is a diagram illustrating an information processing system 1 (1B) according to the altered example.

The user (the user U1 for example) gives a transmission job execution instruction by using their personal computer 30 (step S14). Here, an execution instruction of an e-mail transmission job (in detail, an e-mail transmission job to transmit mail to which electronic data in the personal computer 30 is attached as an attachment file to a desired destination (also referred to as an "in-device data attached e-mail transmission job")) is given by the user U1.

When the e-mail transmission job execution instruction is given by the user U1 (step S14), the personal computer 30 performs communication and the like with the wearable terminal 50 of the user U1 (or the server 80) and executes the biological information acquisition process (steps S15 to S17).

Then, the personal computer 30 determines whether the state of the user U1 is in a normal state or an off-normal state (step S18 (S31)) based on the acquired biological information.

For example, when it is determined that the user U1 is in a normal state, the personal computer 30 decides that the transmission of the e-mail transmission job needs to be executed (step S33). Then, the personal computer 30 transmits (mail transmission) the transmission target data (the electronic data in the personal computer 30 in this example) related to the e-mail transmission job to a destination set by the user U1.

On the other hand, when it is determined that the user U1 is in an off-normal state, the personal computer 30 executes a confirmation request process (the process in step S32 according to the first embodiment, the process in steps S42 or S43 according to the second embodiment, or the like). After that, when a confirmation completion operation indicating that the confirmation related to the transmission job is completed is given by the user U1, the personal computer 30 determines that the transmission of the transmission target data needs to be executed (step S33). Then, the transmission target data (the electronic data in the personal computer 30) related to the e-mail transmission job is transmitted (mail transmission) to the destination set by the user U1.

In this manner, the personal computer 30 may be made to execute each process of FIG. 4 and the like as the information processing device 100.

Modification Example Related to Confirmation Request Process and the Like in Case where Normal State is Determined Further, in the above respective embodiments, the confirmation request process (step S19 (FIG. 4)) is not executed when it is determined that the user who has given the transmission job execution instruction is in a normal state; however, this does not set any limitation and the confirmation request process may be executed even when it is determined that the user is in a normal state.

However, in this alternated example, in a confirmation request process executed when it is determined that the user is in a normal state, a confirmation of a smaller number of confirmation items may be requested, compared to the number of the confirmation items requested to be confirmed in a confirmation request process executed when it is determined that the user is an off-normal state. In other words, in a confirmation request process executed when it is determined that the user is in an off-normal state, a confirmation of a larger number of confirmation items is requested, compared to the number of confirmation items to be requested to be confirmed in a confirmation request process executed when it is determined that the user is in a normal state.

Concretely, when it is determined that the user is in a normal state, the first type confirmation request process (see step S42 (FIG. 7) according to the second embodiment) is executed. On the other hand, when it is determined that the user is in an off-normal state, the second type confirmation request process (see step S43 according to the second embodiment) is executed.

In this manner, when a confirmation request process is executed during the execution of the transmission job regardless of whether the user who has given the transmission job execution instruction is in a normal state or an off-normal state, the confirmation request process of a type corresponding to the user's state may be executed.

Accordingly, although the user who has given the transmission job execution instruction is requested to make a confirmation related to the transmission job, the user is requested to confirm a relatively small number of confirmation items only when the user is in a normal state (compared to a case where the user is in an off-normal state). Thus, an occurrence of a mistake made by a user related to the transmission job can be suppressed while preventing the user's work efficiency from being significantly reduced.

Modification Example Related to Transmission Job

Further, in the above respective embodiments, each process of FIG. 4 and the like is executed when an e-mail transmission job is executed as a transmission job; however, this does not set any limitation and each process of FIG. 4 may be executed when another transmission job (a facsimile reception job, for example) is executed.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An information processing device comprising a hardware processor configured to;
    acquire a determination result of a state of a user, who has given a transmission job execution instruction, determined based on biological information of the user compared to a predetermined threshold value, the biological information including information related to at least one of a pulse wave, an electrocardiogram, a temperature, a heart rate, or a blood pressure; and
    control an execution of the transmission job according to the user state determination result,
    wherein when it is determined that the user is in an off-normal state, the user being in the off-normal state when the acquired biological information of the user is equal to or larger than the predetermined threshold value, the hardware processor executes a confirmation request process to request the user to make a confirmation related to the transmission job,
    wherein
    the hardware processor also executes the confirmation request process when the user is in a normal state, the user being in the normal state when the acquired biological information of the user is smaller than the predetermined threshold value, and
    a confirmation of a larger number of confirmation items are requested in the confirmation request process executed in a case where it is determined that the user is in an off-normal state, compared to the number of the confirmation items requested to confirm in a confirmation request process executed in a case where it is determined that the user is in an normal state, and
    wherein the hardware processor decides that transmission of transmission target data needs to be executed when the confirmation request process is executed, in a case where a confirmation completion operation indicating an intention that a confirmation related to the transmission job is completed is given by the user.

2. The information processing device according to claim 1, wherein
    the hardware processor acquires the biological information measured by a wearable device worn by the user from the wearable device via communication with the wearable device.

3. The information processing device according to claim 1, wherein
    the hardware processor acquires the biological information, which is transferred to a server after measured by a wearable device worn by the user and stored in the server, from the server via communication with the server.

4. The information processing device according to claim 1, wherein the information processing device is a multifunctional peripheral configured to transmit transmission target data related to the transmission job.

5. The information processing device according to claim 1, wherein the transmission job is an e-mail transmission job or a facsimile transmission job.

6. The information processing device according to claim 1, wherein the confirmation items comprise transmission target data related to the transmission job, a destination of transmission target data related to the transmission job, or remained original prevention.

7. An information processing device comprising a hardware processor configured to:
acquire a determination result of a state of a user, who has given a transmission job execution instruction, determined based on biological information of the user compared to a first predetermined threshold value, the biological information including information related to at least one of a pulse wave, an electrocardiogram, a temperature, a heart rate, or a blood pressure; and
control an execution of the transmission job according to the user state determination result,
wherein when it is determined that the user is in an off-normal state, the user being in the off-normal state when the acquired biological information of the user is equal to or larger than the first predetermined threshold value, the hardware processor executes a confirmation request process to request the user to make a confirmation related to the transmission job, and
wherein
in a case where it is determined that the user is in an off-normal state, the hardware processor
executes a first type confirmation request process when it is determined that an off-normal level, which is a level of the off-normal state of the user, is smaller than a second predetermined threshold value, the second predetermined threshold value being larger than the first predetermined threshold value,
executes a second type confirmation request process when it is determined that the off-normal level is equal to or greater than the second predetermined threshold value, and
decides that transmission of transmission target data needs to be executed when the first or second confirmation request process is executed, in a case where a confirmation completion operation indicating an intention that a confirmation related to the transmission job is completed is given by the user,
wherein a larger number of confirmation items are requested to be confirmed in the second type confirmation request process, compared to the number of confirmation items requested to confirm in the first type confirmation request process.

8. The information processing device according to claim 7, wherein the hardware processor is further
configured to be able to set the second predetermined threshold value for each user,
wherein the hardware processor lowers the second predetermined threshold value related to the user when a change rate, which is calculated by dividing a number of changes related to the transmission job setting content made during the second type confirmation request process executed related to the user by a number of executions during the second type confirmation request process executed related to the user, is greater than a predetermined rate.

9. An information processing device comprising a hardware processor configured to:
acquire a determination result of a state of a user, who has given a transmission job execution instruction, determined based on biological information of the user compared to a predetermined threshold value, the biological information including information related to at least one of a pulse wave, an electrocardiogram, a temperature, a heart rate, or a blood pressure; and
control an execution of the transmission job according to the user state determination result,
wherein when it is determined that the user is in an off-normal state, the user being in the off-normal state when the acquired biological information of the user is equal to or larger than a predetermined threshold value the hardware processor executes a confirmation request process to request the user to make a confirmation related to the transmission job,
wherein
the hardware processor is further
configured to be able to set the predetermined threshold value for each user, wherein
the hardware processor lowers the predetermined threshold value related to the user when a change rate, which is calculated by dividing a number of changes related to the transmission job setting content made during the confirmation request process executed related to the user by a number of executions during the confirmation request process executed related to the user, is greater than a predetermined rate, and
wherein the hardware processor decides that transmission of transmission target data needs to be executed when the confirmation request process is executed, in a case where a confirmation completion operation indicating an intention that a confirmation related to the transmission job is completed is given by the user.

10. A non-transitory recording medium storing a computer readable program for causing a computer mounted in an information processing device to execute the steps of:
step a) of acquiring a determination result of a user's state determined based on biological information of the user who has given a transmission job execution instruction compared to a predetermined threshold value, the biological information including information related to at least one of a pulse wave, an electrocardiogram, a temperature, a heart rate, or a blood pressure; and
step b) of controlling an execution of the transmission job according to the determination result of the user's state,
wherein when it is determined that the user is in an off-normal state in the step b), the user being in the off-normal state when the acquired biological information of the user is equal to or larger than the predetermined threshold value, a confirmation request process for requesting the user to make a confirmation related to the transmission job is executed;
wherein when it is determined that the user is in a normal state in the step b), the user being in the normal state when the acquired biological information of the user is smaller than the predetermined threshold value, the confirmation request process is also executed,
a confirmation of a larger number of confirmation items are requested in the confirmation request process executed in a case where it is determined that the user is in an off-normal state, compared to the number of the confirmation items requested to confirm in a confirmation request process executed in a case where it is determined that the user is in an normal state, and
wherein the hardware processor decides that transmission of transmission target data needs to be executed when the confirmation request process is executed, in a case where a confirmation completion operation indicating an intention that a confirmation related to the transmission job is completed is given by the user.

11. An information processing system comprising a hardware processor configured to:
  acquire biological information of a user who has given a transmission job execution instruction, the biological information including information related to at least one of a pulse wave, an electrocardiogram, a temperature, a heart rate, or a blood pressure;
  determine a state of the user based on the acquired biological information compared to a predetermined threshold value; and
  control an execution of the transmission job according to the user's state determination result,
  wherein the hardware processor executes a confirmation request process for requesting a confirmation related to the transmission job to the user when it is determined that the user is in an off-normal state, the user being in the off-normal state when the acquired biological information of the user is equal to or larger than the predetermined threshold value;
  wherein the hardware processor also executes the confirmation request process when it is determined that the user is in a normal state, the user being in the normal state when the acquired biological information of the user is smaller than the predetermined threshold value,
  wherein the hardware processor decides that transmission of transmission target data needs to be executed when the confirmation request process is executed, in a case where a confirmation completion operation indicating an intention that a confirmation related to the transmission job is completed is given by the user, and
  wherein a confirmation of a larger number of confirmation items are requested in the confirmation request process executed in a case where it is determined that the user is in an off-normal state, compared to the number of the confirmation items requested to confirm in a confirmation request process executed in a case where it is determined that the user is in an normal state.

* * * * *